US008625004B2

(12) United States Patent
Witt

(10) Patent No.: US 8,625,004 B2
(45) Date of Patent: Jan. 7, 2014

(54) METHOD AND APPARATUS FOR DETERMINING THE MOVEMENT OF AN OPTICAL AXIS

(75) Inventor: Sarah Elizabeth Witt, Winchester (GB)

(73) Assignee: Sony Corporation, Tokyo (JP)

( * ) Notice: Subject to any disclaimer, the term of this patent is extended or adjusted under 35 U.S.C. 154(b) by 358 days.

(21) Appl. No.: 13/179,971

(22) Filed: Jul. 11, 2011

(65) Prior Publication Data

US 2012/0050540 A1 Mar. 1, 2012

(30) Foreign Application Priority Data

Aug. 27, 2010 (GB) .................................. 1014337.8

(51) Int. Cl.
*H04N 5/262* (2006.01)
*H04N 5/228* (2006.01)

(52) U.S. Cl.
USPC ..................................... 348/240.1; 348/222.1

(58) Field of Classification Search
USPC ......... 348/222.1, 240.99, 240.1, 240.2, 240.3
See application file for complete search history.

(56) References Cited

U.S. PATENT DOCUMENTS

| 6,853,808 | B1 * | 2/2005 | Yasuda et al. .................... 396/72 |
| 2005/0036776 | A1 * | 2/2005 | Yasuda et al. .................... 396/72 |
| 2007/0165942 | A1 * | 7/2007 | Jin et al. ........................ 382/154 |

OTHER PUBLICATIONS

United Kingdom Search Report issued Nov. 24, 2010, in Great Britain Patent Application No. GB1014337.8, filed Aug. 27, 2010.

* cited by examiner

*Primary Examiner* — Nicholas Giles
(74) *Attorney, Agent, or Firm* — Oblon, Spivak, McClelland, Maier & Neustadt, L.L.P.

(57) ABSTRACT

A method of determining the movement in position of the optical axis of a camera having an optical zoom lens, comprising the steps of: obtaining a test image at a predetermined level of optical zoom; applying a digital zoom to at least part of the test image, selecting a plurality of test points in the digitally zoomed test image; changing the level of optical zoom by a predetermined amount and changing the level of digital zoom; obtaining the test image at the different level of zoom; analyzing the digitally zoomed test image at the different level of optical zoom; searching at least part of the digitally zoomed test image at the different level of zoom for two of said plurality of said test points; converting the position of the test points in the digitally zoomed images into corresponding positions within the optically zoomed images; and determining the amount of movement of the optical axis on the basis of the difference in position between corresponding test points within the optically zoomed images.

15 Claims, 3 Drawing Sheets

METHOD AND APPARATUS FOR DETERMINING THE MOVEMENT OF AN OPTICAL AXIS

BACKGROUND OF THE INVENTION

1. Field of the Invention

The present invention relates to a method and apparatus for determining the movement of an optical axis.

2. Description of the Prior Art

When creating stereoscopic images it is necessary to have a camera arrangement which has two lenses capturing the scene. These camera lenses will ideally be identical except for a horizontal disparity appropriate for the stereoscopic images to be captured. Moreover, as the cameras are used during filming, it is important that the cameras and their respective lenses behave in an identical way.

One issue which is to be addressed by embodiments of the present invention is the change in optical axis of each lens during zooming. This is a problem during filming of stereoscopic images because the amount that the optical axis changes is different for each lens. Therefore, as a stereoscopic camera arrangement zooms in or zooms out, the relative disparity changes.

This causes discomfort for the viewer.

It is an aim of the present invention to address this problem.

SUMMARY OF THE INVENTION

According to one aspect of the present invention, there is provided a method of determining the movement in position of the optical axis of a camera having an optical zoom lens, comprising the steps of: obtaining a test image at a predetermined level of optical zoom; applying a digital zoom to at least part of the test image, selecting a plurality of test points in the digitally zoomed test image; changing the level of optical zoom by a predetermined amount and changing the level of digital zoom; obtaining the test image at the different level of zoom; analysing the digitally zoomed test image at the different level of optical zoom; searching at least part of the digitally zoomed test image at the different level of zoom for two of said plurality of said test points; converting the position of the test points in the digitally zoomed images into corresponding positions within the optically zoomed images; and determining the amount of movement of the optical axis on the basis of the difference in position between corresponding test points within the optically zoomed images.

This enables the amount of optical axis movement to be quantified and provided to users of the lens.

The initial predetermined level of optical zoom may be maximum zoom.

The method may further comprise applying a blurring component to the digitally zoomed image at the maximum optical zoom level, the amount of blurring being based on the amount of optical zoom applied at the maximum optical zoom level.

The zoom reading may be changed by $1/64^{th}$ of the maximum range before the test image is obtained.

The method may comprise defining a line between the corresponding positions of a test point in two different optically zoomed images, and determining the amount of movement of the optical axis on the basis of the difference in position between corresponding intersections of the lines.

The method may comprise applying a weighting to the intersections, whereby the weighting is determined in accordance with the angle between the intersecting lines.

According to another aspect, there is provided a method of calibrating a camera to correct for the movement of the optical axis comprising the steps of determining the movement of the optical axis according to any of the above and applying a correction factor to the position of the image captured by the camera, the correction factor being determined in accordance with the determined movement of the optical axis.

According to another aspect, there is provided a computer program containing computer readable instructions which, when loaded onto a computer, configure the computer to perform a method according to any of the above.

According to another aspect, there is provided an apparatus for determining the movement in position of the optical axis of a camera having an optical zoom lens, comprising:

an image obtaining device operable to obtain a test image at a predetermined level of optical zoom, wherein the optical zoom is changeable by a predetermined amount;

a digital zoom device operable to apply a digital zoom to at least part of the test image, a selector operable to select a plurality of test points in the digitally zoomed test image;

the image obtaining device being operable to obtain the test image at the different level of zoom changed by the predetermined amount; an analyser operable to analyse the digitally zoomed test image at the different level of optical zoom; a searching device operable to search at least part of the digitally zoomed test image at the different level of zoom for two of said plurality of said test points; a converter operable to convert the position of the test points in the digitally zoomed images into corresponding positions within the optically zoomed images; and a determiner operable to determine the amount of movement of the optical axis on the basis of the difference in position between corresponding test points within the optically zoomed images.

The initial predetermined level of optical zoom may be maximum zoom.

The apparatus may further comprise a blurring device operable to apply a blurring component to the digitally zoomed image at the maximum optical zoom level, the amount of blurring being based on the amount of optical zoom applied at the maximum optical zoom level.

The zoom reading may be changed by $1/64^{th}$ of the maximum range before the test image is obtained.

The apparatus may further comprise a line definer operable to define a line between the corresponding positions of a test point in two different optically zoomed images, and determining the amount of movement of the optical axis on the basis of the difference in position between corresponding intersections of the lines.

A weighting may be applied to the intersections, whereby the weighting is determined in accordance with the angle between the intersecting lines.

According to another aspect, there is provided an apparatus for calibrating a camera to correct for the movement of the optical axis comprising an apparatus according to any one of the above and an application device operable to apply a correction factor to the position of the image captured by the camera, the correction factor being determined in accordance with the determined movement of the optical axis

BRIEF DESCRIPTION OF THE DRAWINGS

The above and other objects, features and advantages of the invention will be apparent from the following detailed description of illustrative embodiments which is to be read in connection with the accompanying drawings in which.

DESCRIPTION OF THE PREFERRED EMBODIMENTS

Figure 1:
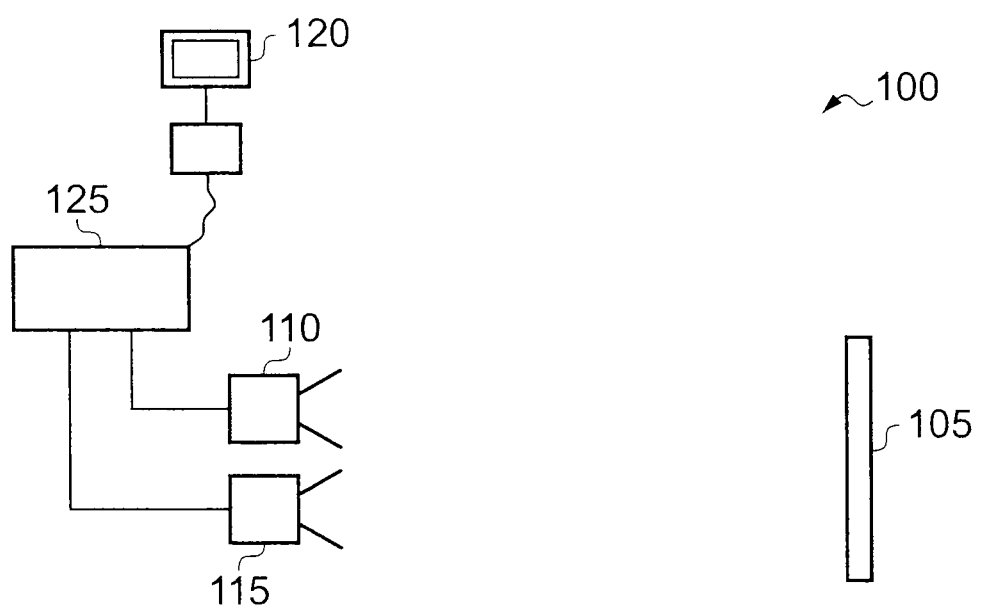
FIG. 1 is a camera test arrangement according to embodiments of the present invention.

FIG. 1 shows a camera test arrangement 100 according to embodiments of the present invention. The camera test arrangement 100 includes a left camera 110 and a right camera 115 arranged on a camera rig (not shown) for capturing stereoscopic images. The left camera 110 and the right camera 115 are focussed on a test image 105. The left camera 110 and the right camera 115 will be calibrated using the camera test arrangement 100. A calibration apparatus 125 is attached to each of the left camera 110 and the right camera 115. The calibration apparatus 125 will be explained in more detail later. Also attached to the calibration apparatus 125 is a user terminal 120 which displays a graphical user interface (not shown). The user terminal 120 allows a user to control the calibration apparatus 125.

Figure 2:
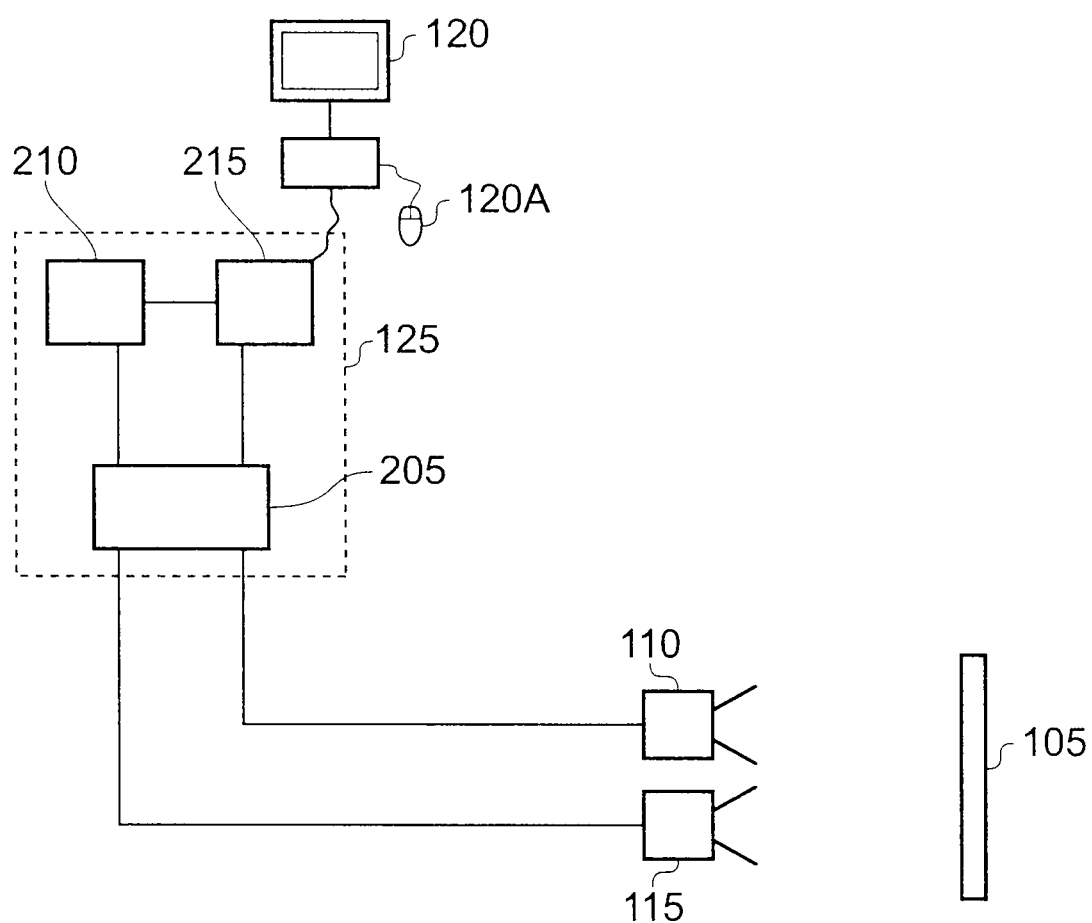
FIG. 2 is a more detailed diagram of FIG. 1.

FIG. 2 shows a more detailed diagram of FIG. 1. In FIG. 2, like reference numerals refer to like features which will not be described in any further detail. As will be apparent from FIG. 2, the user can interact with the user terminal 120, and therefore the calibration apparatus 125 using a mouse 120A and a keyboard (not shown).

The calibration apparatus 125 contains a camera adapter 205 which is connected to the left camera 110 and the right camera 115. The camera adaptor 205 is operable to receive data from, and provide data to, the left camera 110 and the right camera 115. A calibration processor 210 is connected to the camera adaptor 205. Additionally, a user terminal adaptor 215 is coupled to the user terminal 120 and is operable to receive data from, and provide data to, the user terminal 120. The calibration processor 210 is also connected to the user terminal adaptor 215. The user terminal 120 and the left camera 110 and the right camera 115 are connected to the calibration apparatus 125 using cables. The HD-SDI data which is sent of over the cables contains video and lens metadata (focal length and 16-bit zoom position). Zoom is controlled by the zoom controller. However, the invention is not so limited and any of these devices may be connected using a wireless connection or over a network. This may be particularly useful if the cameras are set up for operation in a venue prior to a live event such as a soccer match.

Although not specifically shown, it is envisaged that a storage medium will be attached to the calibration apparatus 125. The storage medium may be internal to the calibration apparatus 125 or may be remote to the calibration apparatus, for example located over a network. It is envisaged that the storage medium is configured to store a computer program therein or thereon. The computer program contains computer readable instructions which, when operational, control the calibration apparatus 125. Specifically, the computer program controls the calibration processor 210. The storage medium may be an optically readable medium or a magnetic medium, or indeed a solid state medium.

The arrangement of FIG. 2 shows the left camera 110 and the right camera 115 focused on a test image 105. The test image may be any stationary image. In embodiments of the present invention, the calibration will take place just after a new set of lenses are placed on the left camera 110 and the right camera 115, although the invention is not limited. The calibration may also be performed at any time and in any location. For example, the calibration can take place "on set", or in other words, just before the camera is to be operated.

The calibration of one of the two cameras will now be described with reference to FIG. 3. The other camera will be calibrated in the same manner and at the same time, however, for clarity only the calibration of one camera will be described.

Figure 3:
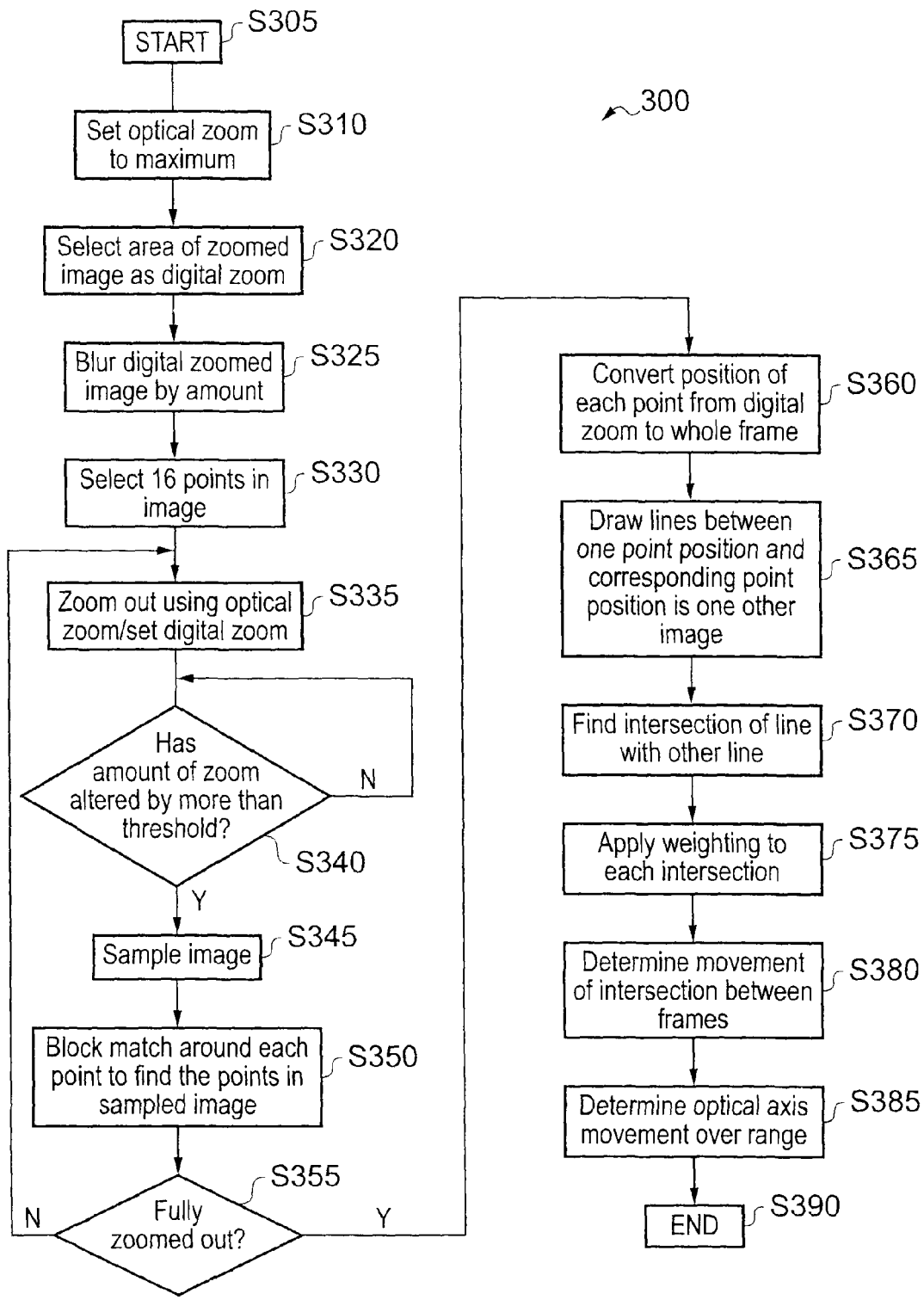
FIG. 3 shows a flow diagram explaining the operation of the calibration apparatus of FIGS. 1 and 2.

Referring to FIG. 3, a flow chart 300 explaining the operation of the calibration apparatus is shown. Prior to calibration, the cameras are set up and focussed on the test image 105. In step S305, the calibration process is started. Before any measurements are taken by the calibration apparatus 125, the optical zoom of the camera is set to maximum. This may be done manually by touching the camera, or may be done from the user terminal 120. This is step S310. It should be noted that any level of optical zoom may be appropriate and that the optical zoom does not have to be set to a maximum level.

After the optical zoom is set to maximum, a zoom reading produced by the camera is taken. The camera produces two numbers; the focal length (mm) which is needed to set the digital zoom in order to compensate for the optical and the zoom position, which goes from 0 to 0xffff over the full range of the zoom. This data is fed to the calibration apparatus 125.

An area of the optically zoomed image is highlighted by the user. This area will be subject to a digital zoom during the calibration process (step S320). In other words, as will be explained later, as the level of optical zoom is reduced, the digital zoom applied to the selected area will be correspondingly increased to counteract the reduction in optical zoom. As the resolution of the digitally zoomed area will gradually reduce as the optical zoom is reduced, a blurring is applied to the digitally zoomed image at this stage. The amount of blurring applied will be similar to the amount of blurring that would occur as the optical zoom is reduced. This is because the position of a number of points is to be tracked in the digitally zoomed image. By applying a blurring at the start of the process, therefore, tracking those points is easier. This is because any points selected for tracking are likely to be still visible at minimum zoom, rather than having fine detail at maximum zoom. The blurring is applied at step S325.

A predetermined number of points in the blurred digitally zoomed image (step S330) are selected. This in embodiments is done automatically (for example randomly selected), although they may be selected by a user. In embodiments, 16 points are used, but the invention is not so limited. The user may select any points at random, or may select points from a particular area in the digitally zoomed image. Alternatively, the points may be automatically selected. The position of each of the 16 points is stored. The optically zoomed image is then captured and the digital zoom is applied thereto.

The optical zoom applied by the camera under test is reduced (step S335). As the optical zoom is reduced, the zoom reading is monitored by the calibration apparatus 125. Firstly, as noted above, as the optical zoom is reduced the digital zoom is correspondingly increased. The digital zoom is increased to compensate for the reduction in optical zoom. The amount of digital zoom does not need to correspond to the optical zoom reduction. Also, the amount of zoom reduction is monitored so that a sample frame can be captured when the optical zoom reading changes by a value of 1024. In other words, the frame will be sampled when the optical zoom reading changes by $1/64^{th}$ of the range of optical zoom reading. Of course other ranges or values of zoom readings could be used.

In order to know when to sample the frame, the calibration apparatus 125 compares the amount of change in the optical zoom since the previous sample frame. When the amount of change is above the threshold, the points in the digitally zoomed image are tracked relative to the previous sampled frame in step S345. It should be noted here that the points in the digitally zoomed image are determined by capturing the optically zoomed image, applying the digital zoom to the captured image and then analysing the digitally zoomed image.

After the digitally zoomed image is determined, at each of the 16 points in the digitally zoomed image, block matching is performed. Block matching is a known technique for establishing which pixels in an area of a new image correspond to the same pixels in the old image. In other words, by performing block matching in the new image around the position of the 16 points in the old image, the calibration apparatus 125 can quickly establish the position of the same 16 points in the new image. The block matching is carried out in step S350. Although the block matching is noted as taking place during the sampling section, the invention is not so limited and may be carried out after the sampling of all the images has taken place.

This sampling continues until in step S355, the camera is treated as being fully optically zoomed out.

In order to produce the most accurate results and to reduce the amount of data stored, only samples captured between 20% and 80% of full optical zoom will be used to calculate a DC position (offset). It should be noted however, that in embodiments, all the samples are used to calculate the optical axis for any particular zoom. This is because when zoom of 80% or 20% of full zoom is applied, the optical axis can be significantly away from the DC position within the range. In other words, the results become skewed.

For the remaining samples, as the amount of digital zoom and optical zoom is known, it is possible to convert the position of each of the 16 captured points in the digitally zoomed image into pixel positions in the optically zoomed image. In other words, in step S360, the position of each pixel in the digitally zoomed image is converted into a pixel position in the optically zoomed image, for a given level of optical zoom.

For each converted point position, a line is drawn between the point position in the current frame and the same point's position in another frame. In embodiments, the other frame has a significantly different zoom value to that of the current frame. This is step S365. The position of the intersection of each line with each other line is then established, and the position of the intersection is noted in step S370. A weighting is then applied to each intersection in step S375; the weighting being linearly dependent on the angle between the lines at intersection. A maximum weighting of 1 will be applied to perpendicular lines and a weighting of 0 is applied to parallel lines. The invention is not so limited, and any other relationship between angle of intersection and weighting is envisaged. The reason that the intersection of lines is used is because the intersection marks the point which has not moved between the zooms, hence the optical axis.

After calculating the DC offset in the frames at the 20% of full optical zoom and the 80% of full optical zoom, all other frames have their optical axis position calculated relative to the 20% and 80% optical axis at step S380. This is the DC offset value. This provides, for each sampled position, a correction for the optical axis of the zoom lens. It is then possible to determine the optical axis correction for any value of zoom by interpolating the results between sampled values (step S385). The calibration then ends in step S390.

It is possible to correct below 20% of full zoom and above 80% of full zoom by taking sample frames in these areas.

Also, instead of taking 64 samples over the entire range, more samples may be taken. For example, twice as many samples may be taken.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

I claim:

1. A method of determining the movement in position of an optical axis of a camera having an optical zoom lens, comprising the steps of:
    obtaining a test image at a predetermined level of optical zoom;
    applying a digital zoom to at least part of the test image,
    selecting a plurality of test points in the digitally zoomed test image;
    changing the level of optical zoom by a predetermined amount and changing the level of digital zoom;
    obtaining the test image at the changed level of zoom;
    analysing the digitally zoomed test image at the changed level of optical zoom;
    searching at least part of the digitally zoomed test image at the changed level of zoom for two of said plurality of said test points;
    converting the position of the test points in the digitally zoomed images into corresponding positions within the optically zoomed images; and
    determining the amount of movement of the optical axis on the basis of the difference in position between corresponding test points within the optically zoomed images.

2. A method according to claim 1, wherein the initial predetermined level of optical zoom is maximum zoom.

3. A method according to claim 2, comprising applying a blurring component to the digitally zoomed image at the maximum optical zoom level, the amount of blurring being based on the amount of optical zoom applied at the maximum optical zoom level.

4. A method according to claim 1, wherein the zoom is changed by $\frac{1}{64}^{th}$ of a maximum range before the test image is obtained.

5. A method according to claim 1 comprising defining a line between the corresponding positions of a test point in two different optically zoomed images, and determining the amount of movement of the optical axis on the basis of the difference in position between corresponding intersections of the lines.

6. A method according to claim 5, comprising applying a weighting to the intersections, whereby the weighting is determined in accordance with an angle between the intersecting lines.

7. A method of calibrating a camera to correct for the movement of the optical axis comprising the method according to claim 1 and applying a correction factor to the position of the image captured by the camera, the correction factor being determined in accordance with the determined movement of the optical axis.

8. A non-transitory storage medium configured to store a computer program that when executed by a processor performs the method of claim 1.

9. An apparatus for determining the movement in position of an optical axis of a camera having an optical zoom lens, comprising:

an image obtaining device operable to obtain a test image at a predetermined level of optical zoom, wherein the optical zoom is changeable by a predetermined amount;

a digital zoom device operable to apply a digital zoom to at least part of the test image, a selector operable to select a plurality of test points in the digitally zoomed test image;

the image obtaining device being operable to obtain the test image at a different level of zoom changed by the predetermined amount;

an analyser operable to analyse the digitally zoomed test image at the different level of optical zoom;

a searching device operable to search at least part of the digitally zoomed test image at the different level of zoom for two of said plurality of said test points;

a converter operable to convert the position of the test points in the digitally zoomed images into corresponding positions within the optically zoomed images; and a determiner operable to determine the amount of movement of the optical axis on the basis of the difference in position between corresponding test points within the optically zoomed images.

10. An apparatus according to claim 9, wherein the initial predetermined level of optical zoom is maximum zoom.

11. An apparatus according to claim 10, comprising a blurring device operable to apply a blurring component to the digitally zoomed image at the maximum optical zoom level, the amount of blurring being based on the amount of optical zoom applied at the maximum optical zoom level.

12. An apparatus according to claim 8, wherein the zoom is changed by $1/64^{th}$ of a maximum range before the test image is obtained.

13. An apparatus according to claim 8 comprising a line definer operable to define a line between the corresponding positions of a test point in two different optically zoomed images, and determining the amount of movement of the optical axis on the basis of the difference in position between corresponding intersections of the lines.

14. An apparatus according to claim 13, wherein a weighting is applied to the intersections, whereby the weighting is determined in accordance with an angle between the intersecting lines.

15. An apparatus for calibrating a camera to correct for the movement of the optical axis comprising an apparatus according to claim 8 and an application device operable to apply a correction factor to the position of the image captured by the camera, the correction factor being determined in accordance with the determined movement of the optical axis.

* * * * *